US 6,645,347 B2

(12) United States Patent
Stein et al.

(10) Patent No.: US 6,645,347 B2
(45) Date of Patent: Nov. 11, 2003

(54) PROCESS AND DEVICE FOR MANUFACTURING LAMINATED PLASTIC CARDS

(75) Inventors: Wolfgang Stein, Freundstadt (DE); Jan Cerajewski, Sulz/Renfrizhausen (DE)

(73) Assignee: Robert Bürkle GmbH, Freudenstadt (DE)

( * ) Notice: Subject to any disclaimer, the term of this patent is extended or adjusted under 35 U.S.C. 154(b) by 18 days.

(21) Appl. No.: 09/741,121

(22) Filed: Dec. 20, 2000

(65) Prior Publication Data

US 2001/0015264 A1 Aug. 23, 2001

(30) Foreign Application Priority Data

Dec. 21, 1999 (DE) .......................... 199 62 081

(51) Int. Cl.⁷ .............. B30B 15/34; B30B 5/02
(52) U.S. Cl. ............ 156/583.3; 156/583.1; 156/580
(58) Field of Search .......... 156/583.1, 583.3, 156/583.91, 583.5; 100/211, 212, 296

(56) References Cited

U.S. PATENT DOCUMENTS

| 4,350,545 A | | 9/1982 | Garabedian |
| 5,635,014 A | * | 6/1997 | Taylor ................. 156/358 |
| 5,788,808 A | * | 8/1998 | Natarajan et al. ........... 156/382 |

FOREIGN PATENT DOCUMENTS

| DE | 91 15 739.0 U1 | 6/1992 |
| DE | 44 41 552 A1 | 5/1996 |
| JP | 06166935 A | 6/1994 |

* cited by examiner

Primary Examiner—Curtis Mayes
Assistant Examiner—George R Koch, III
(74) Attorney, Agent, or Firm—Volpe and Koenig, P.C.

(57) ABSTRACT

The invention concerns a process and a press for manufacturing laminated plastic cards, such as check guarantee cards, credit cards and the like of several films to be pressed together with each other. Moreover, operations are conducted with two compression plates which are movable relative to each other which accommodate in the compression slot the films to be pressed together with their pressure plates with the interposition of at least one compression pad. It is essential that this compression pad is held rigidly or displaceably on the press.

7 Claims, 4 Drawing Sheets

PROCESS AND DEVICE FOR MANUFACTURING LAMINATED PLASTIC CARDS

BACKGROUND

The invention concerns a process and a press for manufacturing laminated plastic cards, such as check guarantee cards, credit cards and the like of several films to be pressed together, having two compression plates which are heatable and/or coolable and which accommodate the films to be pressed in the compression slot, whereby at least one compression pad and a pressure plate are arranged between the films and at least one compression plate.

To the extent that plastic cards are presently being discussed, any desired laminated cards are to be understood by this in connection with which the electronic components such as data carriers, magnetic strips or chips, are arranged either in the outer surfaces or, as with the so-called non-contacting cards, are incorporated into the interior. The cards moreover comprise of at least two sheets as cover sheets and at least one sheet as middle sheet. These films are brought, in one or more successive heat presses, by the action of pressure and heat, to the melting temperature required for the lamination process and subsequently cooled down in at least one cold press until the individual cards can be stamped out of the laminate.

In manufacturing such plastic cards, the exact control of the process temperature during the pressing process is of particular significance. Not only must the correct melting temperature be reached in the core of the individual films in order to guarantee the lamination process, but it is also necessary to observe the temperature gradient.

An excessively rapid increase in temperature can generate bubbles in the plastic. In contrast, with an excessively rapid cooling, in particular in connection with a chilling of the hot films on the cold compression plates of the cold press, the formation of cracks can occur.

For this reason, frequently so-called compression pads are used which are embedded between the film package and the compression plates. They prevent a local overheating in the hot press as well as chilling in the cold press because they ensure a uniform heat transfer. In addition to this, thickness tolerances in the compression material and the compression plates are also balanced.

Another important requirement is provided in that the surface of the plastic card must be constructed absolutely flat, with bright luster and without faults. This is attained in that the films to be laminated are in any given case grasped between so-called pressure plates. These pressure plates are made of high luster polished high grade steel sheets of about 0.5 mm thickness, although in the future, perhaps other materials can be used as well. These pressure plates insure that the laminate receives the desired smooth surface. Selectively, contoured pressure plates can also be used if the plastic cards are supposed to have a corresponding surface structure.

In order to increase productivity, use of so-called multiple stage presses in which a great number of film stacks stacked one above the other can be laminated at the same time is known. Here of course a certain temperature drop between the outside lying heated films and the core area must be tolerated, which is disadvantageous for exact adherence to the processing temperature.

In addition, these multiple stage presses require a great number of the previously mentioned pressure plates which causes considerable costs due to their high luster polished finish.

Not in the least, multiple stage presses also require a relatively long cycle time until the laminates are heated up and cooled down again. It is necessary to allow for about 45 minutes until a ready laminate can be further processed.

In addition, manufacturing laminates individually is also known through DE 44 41 552. This means that only so many individual films are fed to the presses as are necessary for one laminated individual film. In this way, one can operate with basically shorter cycle times in the seconds range and also control the temperature course in the films more precisely. Moreover, the equipment expenditure is clearly lower than with a multiple stage press.

SUMMARY

Proceeding from this, underlying the present invention is the objective of further perfecting the last described short cycle process for plastic card laminates, especially to simplify the process sequence and to increase the cycle speed.

This object is accomplished in accordance with the invention in that the compression pads are no longer applied as previously known as a loose intermediate layer or placed under the stack of films, but in that they are held (rigidly or displaceably) on the press.

In this way, aligning and applying the compression pads in the positioning station where the stack of films is built up, as well as dismounting the compression pad in the removal station where the finished laminates are taken out are dispensed with. The sequence of operations is in this way simpler and shorter, and a source of defects is eliminated because during application of the compression pad, there exists the risk of moving the films situated underneath. The process consequently permits the manufacture of laminated plastic cards with a short cycle time process in the seconds range.

In refining the invention, keeping the compression pad under tensile stress (at least the compression pad arranged on the upper compression plate) is recommended so that it does not sag, but rather is held in place on the compression plate over as large an area as possible and consequently also assumes their heating or cooling temperature.

Basically, it would also be possible to glue the compression pad to its respective compression plate. But then changing, which is necessary now and then, would be more expensive than using a fastening device which is easily accessible on the exterior, meaning that it can be mounted on the periphery of the compression plate.

Appropriately, the compression pad projects on at least two edges lying opposite each other laterally beyond the compression plate and is fixed there under tensile stress, in particular unilaterally connected to a fastening device. Here the projecting edges of the compression pad can also be more or less bent backward, thus in the direction opposite to the compression slot, so that the attachment of the compression pad in relation to the compression plate is likewise shifted in the direction opposite to the compression slot.

Generally it suffices if the one projecting edge of the compression pad is fixed alongside the compression plate, while the opposite edge is mounted in the fastening device. This fastening device can be constructed in the form of a clamp which is adjustably mounted somewhat parallel to the contact surface of the associated compression plate on it.

The compression pad is preferably a rubber-elastic band with a thickness in the order of magnitude of 1 mm. In order for it to withstand the desired bracing, it can have a fabric in the interior which is coated with plastic on both sides.

With respect to the process, it is especially appropriate to use the separation surface for the transport of films to the individual treatment stations, especially such that pressure plates are used which protrude on the edge opposite the films on two opposite sides and are picked up on this protruding edge by the transport device.

At the same time, the pressure plates can easily be pressed together by the transport device in order to maintain the exact fitting position of the individual films prior to lamination. Alternatively, the pressure plates are only held in their relative position in relation to one another by fixation pins traversing them.

Basically, an endless circulating transport device can be used which passes through all processing stations. Usually it is more economical, however, to construct the transport device such that it always travels back and forth only between two adjacent processing stations.

So that the laminate can easily be taken out of the removal station, especially in order to cancel its adhesion to the pressure plates, it is recommended that the pressure plate be somewhat bent with the laminate in the sense of an even arching. After this at least the one presser plate can easily be lifted from the laminate.

BRIEF DESCRIPTION OF THE DRAWINGS

Further features and advantages of the invention emerge from the following description of a preferred embodiment on the basis of the drawings, wherein.

DETAILED DESCRIPTION OF THE PREFERRED EMBODIMENTS

Figure 1:
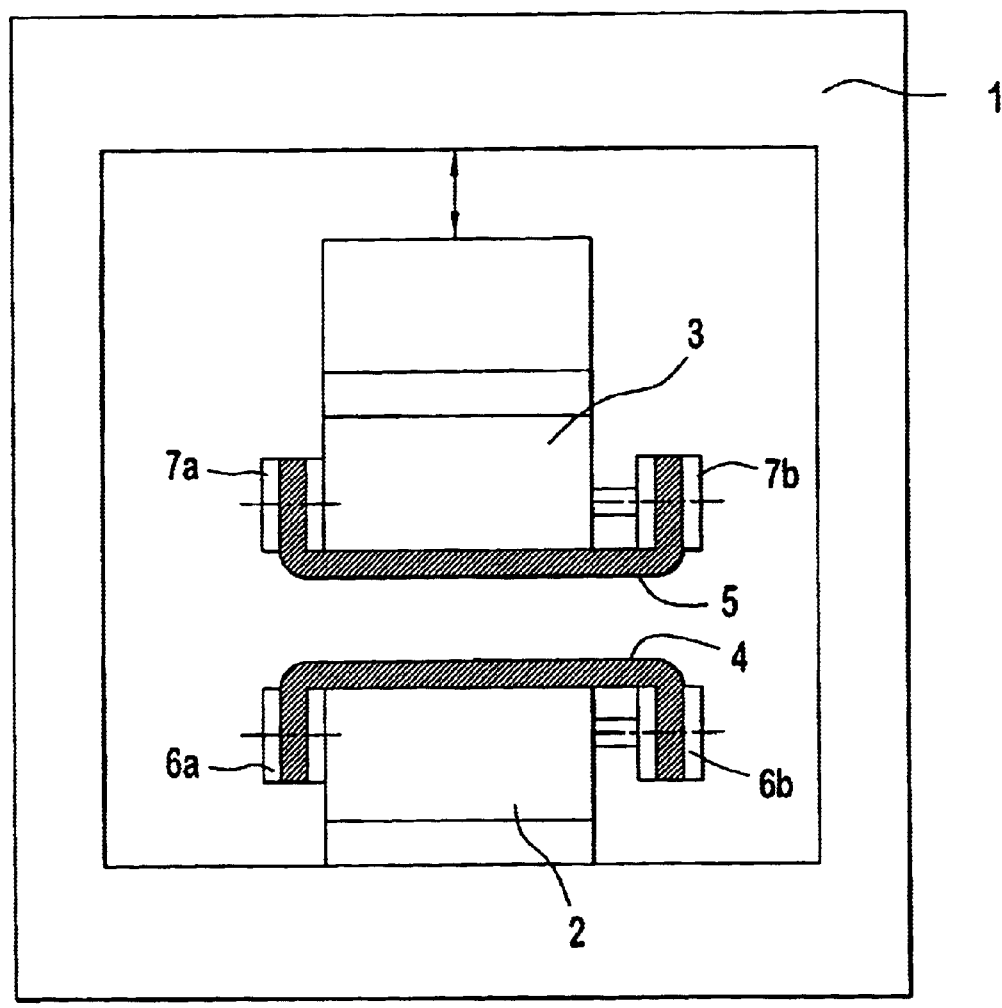
FIG. 1 shows a schematic elevation of the press with its compression pads.

In FIG. 1, one will recognize a compression frame 1 with a fixed lower compression plate 2 and a vertically movable upper compression plate 3. The two compression plates 2 and 3 are heated or cooled in any given case according to whether it is of a hot press or a cold press.

It is now essential for a compression pad 4 or 5 to be mounted in any given case on the upper side of the lower compression plate 2 as well as on the underside of the upper compression plate 3. This compression pad, by way of example may be an artificial fiber fabric coated with Teflon on both sides, which is bent 90° down or up on its right and left protruding edges and fixed on retention jaws 6a and 6b or 7a and 7b. At the same time, the retention jaws 6b and 7b are not rigidly fixed on their respective compression plate, but can be outwardly restrained mechanically, hydraulically or in another manner transverse to the stroke motion of the compression plates. The retention jaws thus operate like a tenter frame on the compression pads 4 and 5 and keep this in tight position on the upper side of the lower compression plate 2 or on the underside of the upper compression plate 3.

The two compression pads and the compression slot are not represented to scale. In fact, the thickness of a compression pad comes to less than 1 mm and that of the compression slot about 30 mm.

Figure 2:
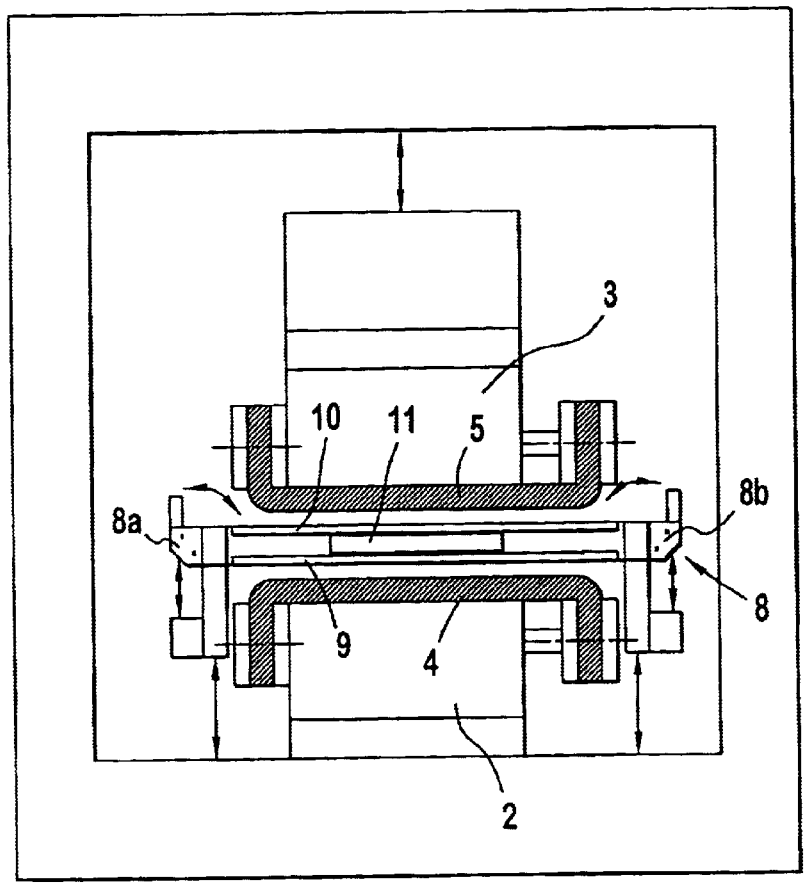
FIG. 2 illustrates a side view similar to FIG. 1 but with the transport device which has transported a package of films into the compression slot.

FIG. 2 depicts the same arrangement, here however with the transport device 8. Its basic feature is clamping devices 8a and 8b which are arranged on both sides of the compression plates and can travel horizontally through the press. Moreover they can also be raised or depressed.

In this embodiment, the clamping devices 8a and 8b have an upper swiveling gripping device through which the two pressure plates 9 and 10 which are arranged below and above the individual films 11 to be laminated can be pressed together. In this way, the films 11 are secured against relative motion during transport from the processing stations before the pressing facility, through the pressing facility, and to the removal station.

During the pressing process in the hot or cold press, the clamping devices can be opened as soon as the films and pressure plates are held by the compressive force generated in the press. Then the transport device travels back with the clamping devices in order to transport the next films with their two pressure plates into the press and at the same time to bring the films laminated in the press and the pressure plates to the next press or to the next processing station.

Figure 3:
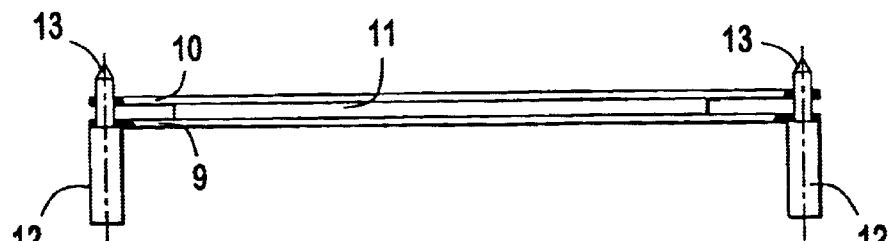
FIG. 3 illustrates an alternative for the transport device.

Instead of such a transport device working in reversing duty, a conveyor system in continuous operation can also be used. Thus, for example, FIG. 3 shows a sliding conveyor or chain transport 12 which passes uniformly horizontal through the presses and can be raised and depressed like transport device 8. It nonetheless bears on its upper side a series of fixation and follower pins 13 extending vertically upward which engage in corresponding holes in the protruding edges of pressure plates 9 and 10. In this way, the pressure plates are likewise secured against shifts in position relative to one another, and the films 11 situated in between are loaded by the weight of the upper pressure plate 10 through which likewise a certain fixation exists.

Figure 4:
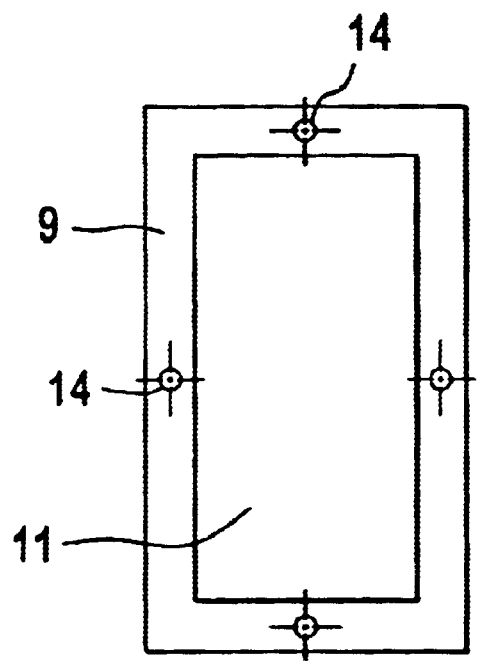
FIG. 4 illustrates the plan of a pressure plate with fixation pins.
Figure 5:
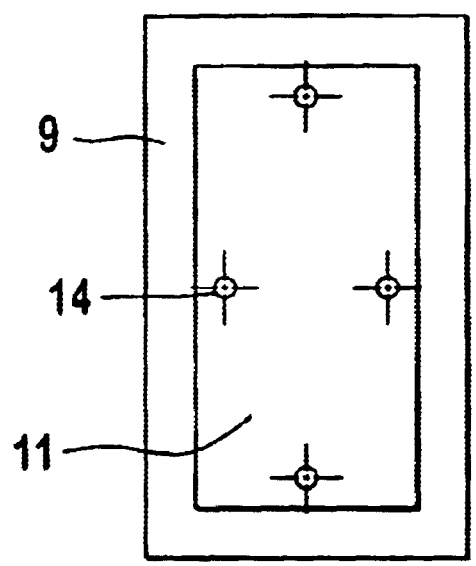
FIG. 5 illustrates the same top view of a pressure plate as FIG. 4 with alternatively positioned fixation pins.

FIGS. 4 and 5 show a plan view of the lower pressure plate 9 with films 11 applied which are to be pressed into a laminate. The upper pressure plate 10 has been omitted for the sake of clarity.

So that the two pressure plates can be aligned, placed together and fixed with the films with an exact fit, fixation pins 14 are used. These fixation pins are positioned in the positioning station, inserted into holes on the protruding edge of the pressure plates opposite the films and serve at the same time as a stop for positioning the films. Frequently two fixation pins 14 arranged on adjacent edges suffice, as shown in FIG. 4. In addition, however, corresponding fixation pins can also be used on the remaining sides as indicated in FIG. 4 with broken lines. In the last mentioned case, the films are then secured on all sides between the fixation pins.

While the films in FIG. 4 are only held on the edge against slipping, there also exists in accordance with FIG. 5 the possibility of arranging the fixation pins 14 within the film borders. In this case, the films must indeed have holes, but receive in return an especially effective fixation.

In the event that the transport of the films and their pressure plates takes place through a transport device in accordance with FIG. 3, the fixation pins 14 can be directly a component of the transport device.

Figure 6:
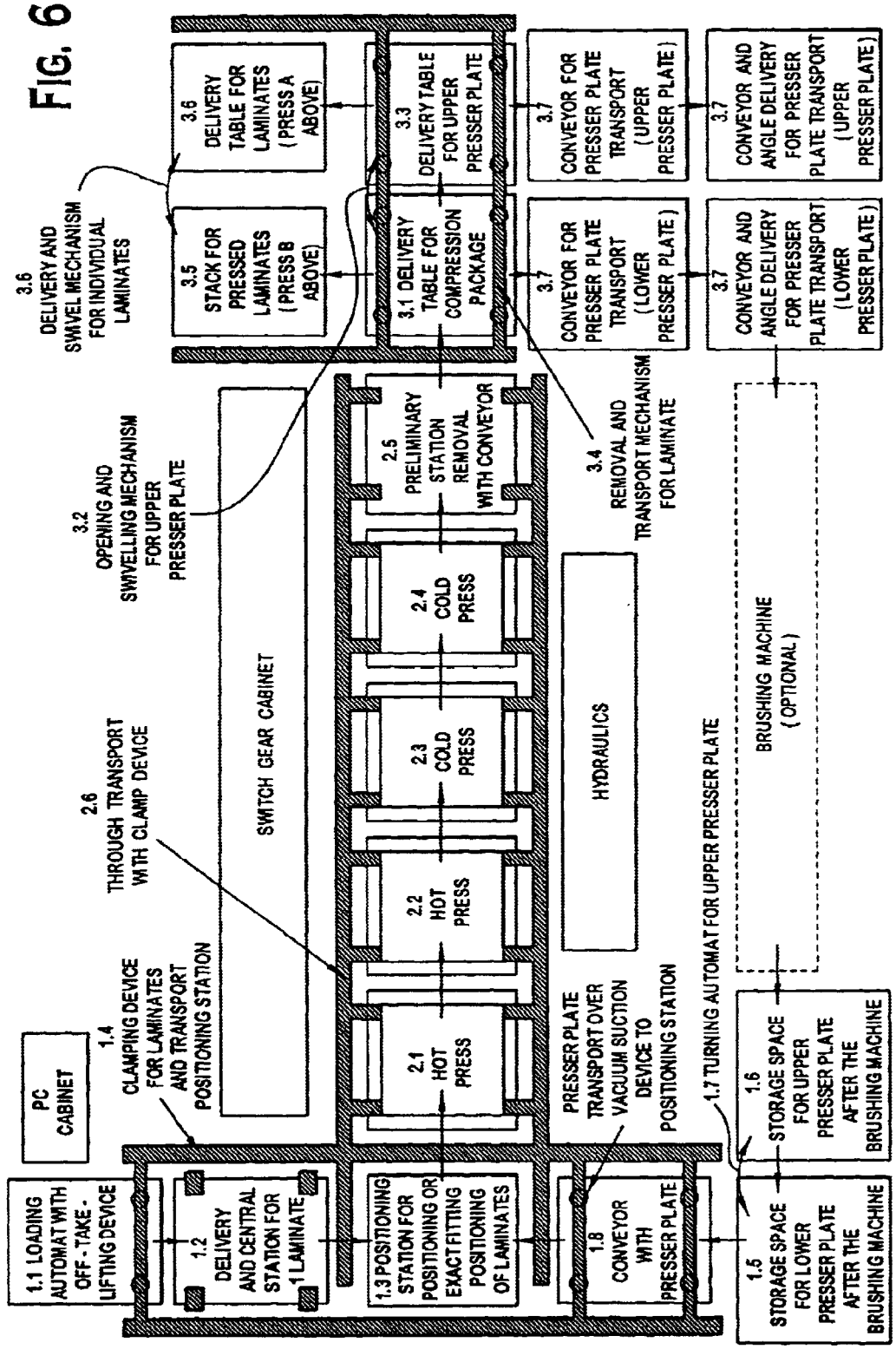
FIG. 6 is a schematic diagram of an installation.

FIG. 6 shows the manufacturing process with the individual processing stations whereby the subsequent description is restricted to the most important steps:

In positioning station 1.3, as many films as are necessary for manufacturing a single laminate are positioned between pressure plates 9 and 10. It lies in the framework of the present invention, however, to stack the films for two laminates one on top of the other since a pressure plate can be placed between the two film stacks. In both cases, the films for a laminate can already be fixed on one another, perhaps through individual welding points.

In order to guarantee an exact fitting together of the pressure plates and the films, pins which can be raised and lowered are arranged in the positioning station corresponding to the previously described fixation pins 14.

First the lower pressure plate with its holes is placed upon the raised pins of the positioning station. Afterward the films are laid upon the pins projecting through the lower pressure plate corresponding to the representation in FIG. 4, or the films are placed with their holes on the pins, corresponding to FIG. 5. Then possibly a middle pressure plate and a further film stack are applied, or the upper pressure plate is directly laid on and fixed in the same way through holes on the pins.

The application of the pressure plates and films can take place manually or automatically.

After assembling the compression package of pressure plates and films, this is compressed by the swivelling clamps 8a and 8b of the transport device and the previously mentioned pins of the positioning station are depressed to release the compression package and for the subsequent transport to the pressing facility.

Instead of this, it is also possible to use a transport device in accordance with FIG. 3 which instead of clamps 8a and 8b has independent fixation pins 13. Or the position protector is passed through loose fixation pins which are clamped in the bore holes of the presser plates corresponding to FIGS. 4 and 5.

The compression package assembled in this manner then reaches at least one hot press with a compression pressure of at least 300 N/cm$^2$ and in at least one cold press with a pressure of at least 600 N/cm$^2$.

The previous locking in of the compression pads, and aligning the compression package, etc. is unnecessary, because the compression pads of the invention are an integral component of the presses.

Heating the hot press takes place in an inherently known manner, for example using heating oil, hot water, steam or electric, whereas the cold press is connected to a water cooling device.

After pressing, the individual films are joined into a laminate and the compression package is opened in opening station 3.2 formed of a delivery table 3.1 for the compression package and a delivery table 3.3 for the upper pressure plate. This takes place appropriately automatically as follows: First the compression package is arched to break down the adhesion between the pressure plates and the laminate. After this, the upper pressure plate is detached by gripping devices or suction devices and swivelled 180°. The lower pressure plate is kept attached.

A sensor determines on which of the two presser plates the laminate lies. Detachment of the laminate then takes place through a vacuum suction device. When the laminate is correctly positioned, the transmission to the stacking place 3.5 takes place directly. To the extent that the laminate was carried along by the upper pressure plate, it is detached on the delivery table 3.3 and finally conveyed to the stack 3.5 true to side through a swivelling mechanism.

The released pressure plates are transported back to the positioning station again.

What is claimed is:

1. Press for manufacturing laminated plastic cards from several films to be pressed together, comprising two compression plates (2,3) which are movable in relation to each other and which are heatable and/or coolable and are adapted to receive the films (11) to be pressed in a compression slot, whereby a compression pad (4,5) and a pressure plate (9, 10) are arranged between the films and at least one of the compression plates, and the compression pad (4,5) is connected with an exterior of said at least one compression plate (2,3) by a fastening device (6a,6b/7a,7b) so that the pad (4,5) is held on to and moves up and down with said at least one compression plate (2,3) of the press;

wherein the compression pad (4,5) has at least one edge that projects laterally beyond the compression plate (2,3), and the projecting edge is fixed under tensile stress; and, wherein the at least one projecting edge of the compression pad (4,5) is held in a clamp (6b, 7b), which is adjustable approximately parallel to a contact surface of the compression plate (2,3) to provide the tensile stress to the compression pad (4, 5).

2. Press according to claim 1, wherein a compression pad (4,5) is held on each of the compression plates (2,3).

3. Press according to claim 1, wherein the compression pad (4,5) has at least two opposite edges that project laterally beyond the compression plate (2,3), and the projecting edges are fixed under tensile stress.

4. Press according to claim 3, wherein the projecting edges of the compression pad (4, 5) are bent in a direction opposite to the compression slot.

5. Press according to claim 1, wherein the compression pad (4,5) is a rubber-elastic band of a fabric coated on both sides with plastic.

6. Press according to claim 1, wherein the compression pad (4,5) has a thickness of about 1 mm.

7. Press according to claim 1, wherein the compression pad (4,5) has a thickness of approximately 0.5 mm to about 0.7 mm.

* * * * *